United States Patent [19]
von Burg et al.

[11] Patent Number: 4,519,778
[45] Date of Patent: May 28, 1985

[54] HEATABLE GODET

[75] Inventors: Paul von Burg, Winterthur; Armin Wirz, Ossingen; Felix Graf, Winterthur, all of Switzerland

[73] Assignee: Rieter Machine Works, Ltd., Winterthur, Switzerland

[21] Appl. No.: 553,044

[22] Filed: Nov. 18, 1983

[30] Foreign Application Priority Data

Dec. 6, 1982 [CH] Switzerland .................. 7074/82

[51] Int. Cl.³ .................. F27D 21/00; F22B 37/46; F22B 37/42
[52] U.S. Cl. .................. 432/35; 122/504.1; 122/504.3
[58] Field of Search .................. 432/35; 219/10.49 A, 219/10.61 A, 469, 470, 471; 122/504.1, 504.3; 165/89 H, 90, 90 H

[56] References Cited

U.S. PATENT DOCUMENTS

| | | | |
|---|---|---|---|
| 1,773,401 | 8/1930 | Lovekin | 122/504.1 |
| 2,813,698 | 11/1957 | Lincoln | 165/90 H |
| 3,603,280 | 9/1971 | Zahuranec | 122/504.1 |
| 3,619,539 | 11/1971 | Taylor | 219/10.61 A |

FOREIGN PATENT DOCUMENTS 602561  5/1948  United Kingdom ............. 122/504.3

Primary Examiner—John J. Camby
Attorney, Agent, or Firm—Kenyon & Kenyon

[57] ABSTRACT

The safety outflow device is provided in an end wall of a heatable godet and may be of a fusible type or pressure responsive type. The fusible safety device has fusible material which fills an outflow passage in a hermetic manner so that upon the occurrence of an excess temperature, the fusible material melts and permits exhaust of the vaporized medium. The pressure responsive safety device employs a burstable disc which bursts at a pressure corresponding to an overheated temperature so as to exhaust the heated medium.

The safety devices serve as additional protection independently of manual and electrical means which may be provided.

4 Claims, 7 Drawing Figures

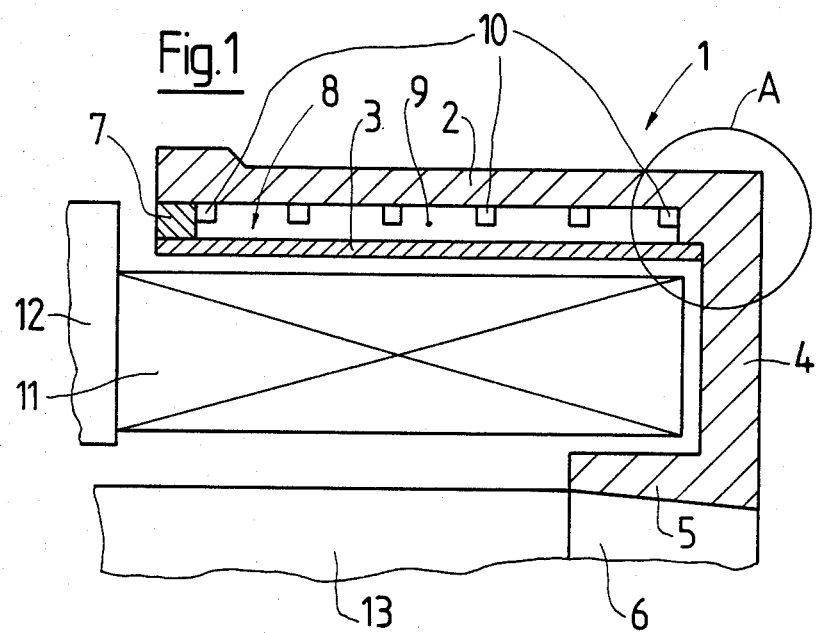
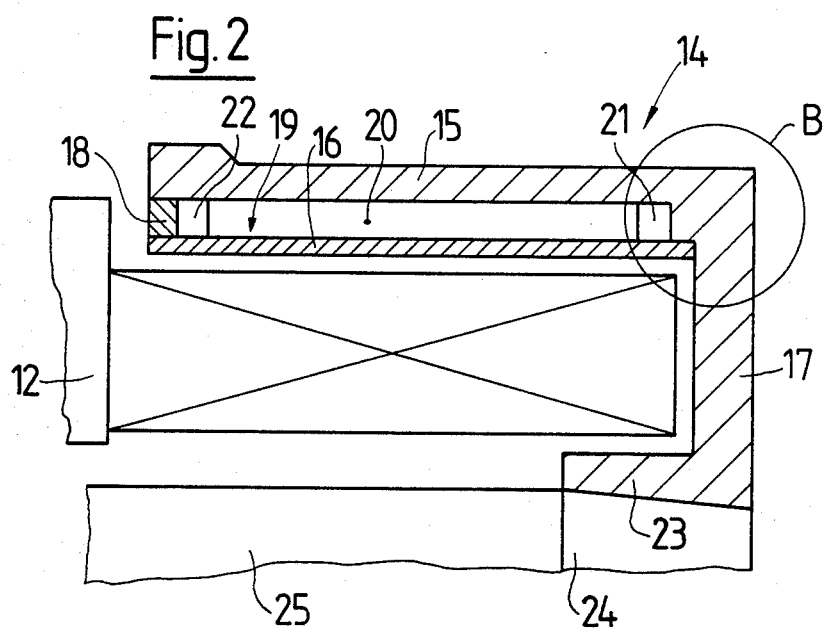

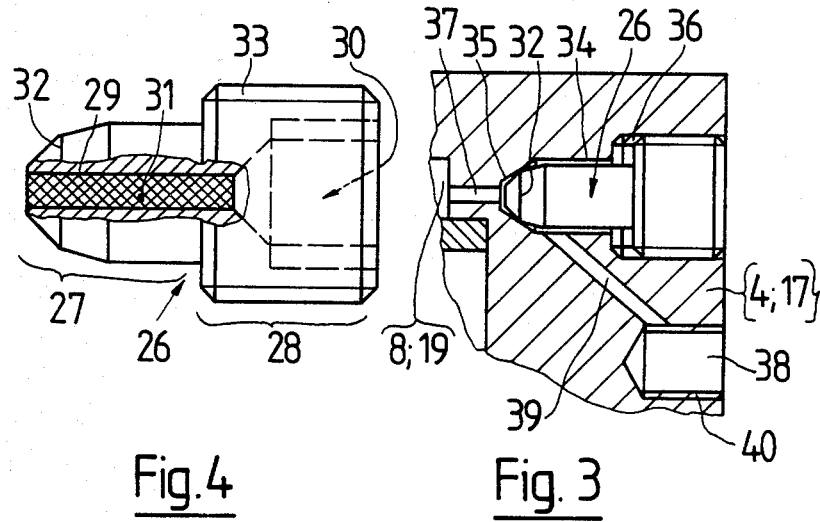
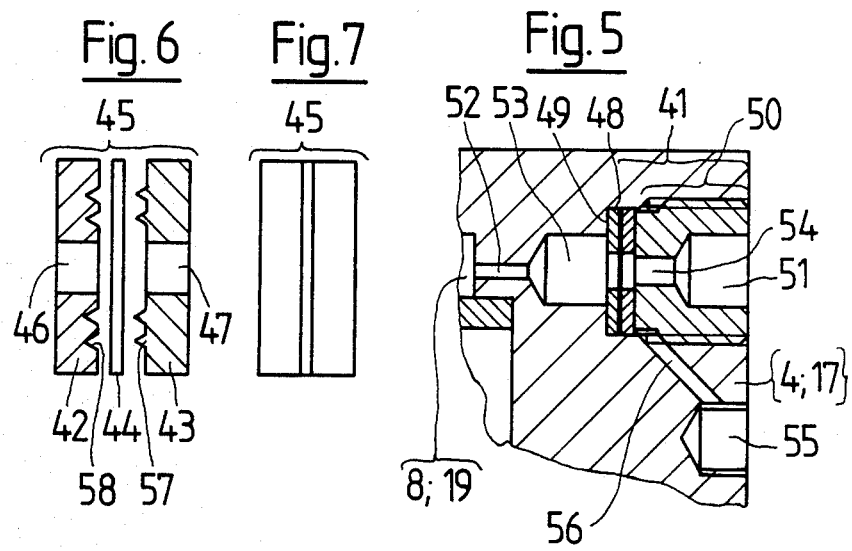

HEATABLE GODET

This invention relates to a heatable godet. More particularly, this invention relates to a heatable godet drawing roll for receiving endless filaments.

Heretofore, various godets have been known on which a thread can be heated. For example, Swiss Pat. No. 557,016 describes a heatable godet for use as a drawing roll for receiving endless filaments. This godet is constructed with an enclosed space which contains a medium which is vaporizable by a heating device, for example an induction coil. In addition, the godet is provided with one temperature sensor to control the heat input and a second temperature sensor to act as a safety control element to protect against undue increases in temperature. For example, this temperature sensor operates so as to switch off the heating device when a predetermined temperature is exceeded by the vaporized medium.

However, it has been found in practice that for some reason, for example through a manual or electrical influence, the control sensor and the safety control sensor fail in such a manner that the medium becomes overheated with the result that damage may be caused to the godet.

Accordingly, it is an object of the invention to provide a relatively simple means for protecting against undue temperature increases in a heatable godet.

It is another object of the invention to provide a relatively simple means to protect against overheating of a heatable godet containing a vaporizable heatable medium.

Briefly, the invention provides a heatable godet which is comprised of a means for defining an enclosed space for a heatable medium and a safety outflow device in communication with the space for venting the heatable medium from the space.

In one embodiment, the safety outflow device includes an outflow opening which communicates with the enclosed space and fusible material within the opening to hermetically close off the opening. This fusible material serves to seal the outflow opening under normal operating conditions and is provided with a predetermined melting point for melting at a predetermined temperature in the enclosed space in order to open the outflow opening for the exhaust of the medium.

In another embodiment, the safety outflow device includes a burstable disc which closes off the enclosed space. In this embodiment, the disc is burstable at a predetermined pressure within the space so as to open the space for the exhaust of the medium.

The safety outflow devices provided in accordance with the invention have the advantage that such are not adversely affected manually or electrically but rather are of a type which reacts directly to pressure arising as a result of overheating or to the temperature associated therewith.

These and other objects and advantages of the invention will become more apparent from the following detailed description taken in conjunction with the accompanying drawings wherein:

FIG. 1 illustrates a part cross-sectional view of a heatable godet constructed in accordance with the prior art;

FIG. 2 illustrates a cross-sectional view of a modified heatable godet constructed in accordance with the prior art;

FIG. 3 illustrates a safety outflow device according to the invention within a godet;

FIG. 4 illustrates a part cross-sectional view of the safety outflow device of FIG. 3;

FIG. 5 illustrates a further safety outflow device according to the invention in a godet;

FIG. 6 illustrates an exploded view of the safety outflow device of FIG. 5; and

FIG. 7 illustrates the outflow device of FIG. 6 in an assembled unit.

Referring to FIG. 1, the godet 1 includes, in substance, a cylindrical wall formed of a cylindrical outer shell 2 and a cylindrical inner shell 3 which is spaced at a suitable radial spacing from the outer shell 2. The two shells 2, 3 are connected together at one of the two end faces by a common disc-shaped wall 4 which is formed with a hub 5 in a central region for securing of the godet 1 on a conical end portion 6 of a rotatable shaft 13. In addition, the godet 1 has an annular connecting part 7 disposed between the shells 2, 3 at the end face opposite the end wall 4. The outer shell 2, connecting part 7, shell 3 and end wall 4 are connected together at their mutual regions of contact in such a manner to form a means for defining a hermetically closed annular space 8.

The annular space 8 within the cylindrical wall of the godet 1 is circumferentially divided by intermediate walls 9 which are provided with access openings 10 for the throughflow of a heatable medium. As shown, a stationary heating device 11 is secured to a machine frame 12 within an annular space defined between the godet wall and the shaft 13.

The shaft 13 is connected to a suitable drive motor (not shown) for rotating the godet 1 about the heating device 11.

Referring to FIG. 2, wherein like reference characters indicate like parts as above, the godet 14 includes a means including a cylindrical outer shell 15, a cylindrical inner shell 15, an end wall 17 and a closing part 18 for defining a hermetically closed annular space 19 for a heatable medium. This space 19 is divided by intermediate walls 20 which are of shorter length than the space 19, as viewed. Thus, openings 21, 22 are created at both ends of the intermediate walls 20 to permit passage of the medium from one chamber defined by the walls 20 within the space 19 to a neighboring chamber.

As shown in FIG. 2, the end wall 17 of the godet 14 has a hub 23 which is connected to a conical end portion 24 of a shaft 25 which is driven by a drive motor (not shown).

Referring to FIG. 3, this figure illustrates a detail indicated by the circle A of FIG. 1 or the circle B of FIG. 2. That is, the safety outflow device 26 can be used in either one of the godets 1, 14 illustrated in FIGS. 1 and 2.

Referring to FIG. 4, the safety outflow device 26 is of a fusible type. As shown, the safety device 26 includes a front portion 27 and a screw threaded part 28. In addition, an outflow opening 29 is formed as a passage which extends through the front portion 27 and which opens into a chamber 30 located in the screw threaded part 28. The chamber 30 is formed of hexagonal cross-sectional shape in order to receive a corresponding hexagonal key. In addition, the outflow opening 29 is hermetically closed off by fusible material 31.

The front portion 27 of the device 26 includes a circumferential sealing edge 32 while the screw threaded part is provided with an external screw thread 33.

Referring to FIG. 3, the end wall (4, 17) of the godet is provided with a passage 34 for receiving the fusible safety device 26. This passage 34 ends with a conical part 35 and is provided with an internal thread 36 corresponding to the screw thread 33 of the safety device 26. As indicated, the fusible safety device is threaded into the end wall 4, 17 so far that the sealing edge 32 sealingly engages with the surface of the conical part 35.

A communication passage 37 is also provided to communicate the passage 34 with the enclosed space 8, 19. In addition, a filling opening 38 and a communication duct 39 are disposed in the end wall 4, 17 in order to permit filling of the medium to be evaporated in operation. Filling is carried out with the safety device 26 threaded in only so far that communication between the communication passage 37 and the communication duct 39 remains.

In order to permit the filling opening 38 to be provided with a connection nipple (not shown) the opening 38 is provided with an internal screw thread 40.

The combination of the filling means, i.e. the filling opening 38 and the duct 39 with the safety device 26 is not essential but advantageous. Filling, for example, can be performed at another location on the end wall 4, 17. In this case, a closure screw (not shown) would be provided to close off the filling opening.

In operation, if a temperature above a predetermined maximum safety temperature occurs as a result of failure of a temperature control (not shown) and a temperature safety control element (not shown), the fusible material 31 melts so that the outflow opening 29 becomes opened to the exhaust of the evaporated medium which is under an excess pressure.

The fusible material 31 should be provided, for example, for a melting temperature between 290° C. and 310° C. This temperature range corresponds to a steam pressure (with a water filling) of 80 to 100 bar.

Referring to FIG. 5, the safety outflow device may be constructed as a pressure responsive type. In this respect, the safety outflow device 41 includes a burstable disc 45 which is burstable at a predetermined pressure in the enclosed space 8, 19 in order to permit the exhaust of the medium within the space 8, 19.

Referring to FIG. 6, the bursting disc 45 includes a receiving portion 42, a pressure portion 43 and an intermediate bursting part 44. When pressed together, the three parts form a unit (FIG. 7) which is obtainable on the market under the trade name "Remble". As shown in FIG. 6, the outer parts 42, 43 are each provided with a bore 46, 47, respectively, of substantially the same diameter while the bursting part 44 has no such bore. In order to retain the parts in the assembled condition, the pressure part 43 is provided with fixing teeth 57 while the receiving part 42 has corresponding recesses 58 to receive the teeth 57.

Referring to FIG. 5, the burstable safety device 41 is disposed within a cylindrical passage 48 in the end wall 4, 17 of the godet. As indicated, the passage 48 has an annular bottom surface 49 against which the disc 45 abuts. In addition, a pressure means 50, in the form of a pressing screw, is received in a corresponding screw thread in the end wall 4, 17 to press the disc 45 in sealed relation against the annular bottom surface 49. In this way, communication between the enclosed space 8, 19 and a blow out opening 51 provided in the pressing screw 50 is interrupted.

The end wall 4, 17 is also provided with a communication passage 52 which extends from the enclosed space 8, 19 to a widening 53 which terminates at the bursting disc 45. In addition, the pressing screw 50 has a communication passage 54 connected coaxially with the blowout opening 51 for a throughflow of the medium from the enclosed space 8, 19 when the disc 45 bursts.

As shown in FIG. 5, the end wall 4, 17 is provided with a filling opening 55 and a filling duct 56 for the filling of the medium to be evaporated. In order to fill the medium into the enclosed space 8, 19, the bursting disc 54 is screwed into the cylindrical passage 48 only so far that a communication remains between the widening 53 and the filling duct 56. As mentioned above with respect to the fusible safety device 26 of FIG. 3, filling does not have to be combined with the safety outflow device.

In operation, if a temperature above a predetermined maximum occurs within the enclosed space 8, 19, the pressure of the evaporated medium increases to the extent that the bursting part 44 of the safety device 41 bursts in the region of the bores 46, 47. Thus, the pressurized evaporated medium is able to exhaust to the outside.

In order to carry out the exhaust operation in a controlled and relatively slow and safe manner, at least one region of the exhaust path between the enclosed space 8, 19 and the free atmosphere, aside from the bores 46, 47, converges or narrows in the form of a throttle. In this regard, the throttle region is sized to exhaust a flow of the heated medium in such a manner that the reduction of pressure lasts over a time period of from 0.5 seconds to 20 seconds. Advantageously, the communication passage 37 and or the outflow opening 29 (see FIGS. 3 and 4) and the communication passages 52 and/or 54 (see FIG. 5) are formed as the throttle regions. The diameter and the length of the throttle regions depend, for a given blow-off pressure, upon the quantity of the medium which is fed in and must be calculated from case to case.

Of note, the bursting disc 45 is constructed to burst in the region of a pressure of from 80 to 100 bar steam pressure.

Of note, the safety outflow devices 26, 41 can be used in either godet 1, 14. Further, the safety devices 26, 41 may also be provided in all godet rolls which operate with an overpressure.

The invention thus provides a godet which is capable of reacting to an excess temperature or pressure of a heated vaporizable medium in a manner to avoid an overheated condition.

The invention further provides a heatable godet which can be readily provided with a safety outflow device for exhausting medium which has been heated excessively.

What is claimed is:

1. A heatable godet comprising
means for defining an enclosed space for a heatable medium;
an exhaust path extending from said space to atmosphere;
a safety outflow device in said path for venting the heatable medium from said space, said safety outflow device including an outflow opening communicating with said space and fusible material within said opening to hermetically close off said opening, said material having a predetermined melting point for melting at a predetermined temperature in said space to open said opening for the exhaust of the medium; and a narrowed throttle region in said path sized to exhaust a flow of the heatable medium from said space over a time period of from 0.5 seconds to 20 seconds.

2. A heatable godet comprising means for defining an enclosed space for a heatable medium;

an exhaust path extending from said space to atmosphere;

a safety outflow device in said path for venting the heatable medium from said space, said safety outflow device including a burstable disc to close off said space, said disc being burstable at a predetermined pressure in said space to open said space for the exhaust of the medium; and a narrowed throttle region in said path sized to exhaust a flow of the heatable medium from said space over a time period of from 0.5 seconds to 20 seconds.

3. A godet comprising a cylindrical wall for receiving a thread, said wall including a hollow annular space for receiving a heatable medium;

a disc-shaped end wall connected to said cylindrical wall, said end wall including a first passage and a communication passage communicating said first passage with said space; and a safety device mounted in said first passage of said end wall for venting of the heatable medium from said space, said device including a front portion in sealed engagement with said first passage and defining an outflow opening in communication with said communication passage and fusible material within said outflow opening for melting in response to a predetermined temperature in said space to open said outflow opening for the exhaust of the medium, at least one of said communication passage and said outflow opening being sized to throttle the flow of heatable medium over a time period of from 0.5 seconds to 20 seconds.

4. A godet comprising a cylindrical wall for receiving a thread, said wall including a hollow annular space for receiving a heatable medium;

a disc-shaped end wall connected to said cylindrical wall, said end wall including a first passage and a communication passage communicating said first passage with said space;

a safety device mounted in said first passage of said end wall for venting of the heatable medium from said space, said device including a bursting disc secured within said first passage for bursting in response to a predetermined pressure in said space to open said first passage to said communication passage; and means for holding said disc in said first passage and including a second communication passage and a coaxial blow out opening and wherein at least one of said communication passages is sized to throttle the flow of heatable medium over a time period of from 0.5 seconds to 20 seconds.

* * * * *